United States Patent [19]

Cocconi

[11] 4,439,822
[45] Mar. 27, 1984

[54] METHOD AND APPARATUS FOR DETECTING AND PREVENTING IMPENDING MAGNETIC SATURATION IN MAGNETIC MATERIALS

[75] Inventor: Alan G. Cocconi, Pasadena, Calif.

[73] Assignee: California Institute of Technology, Pasadena, Calif.

[21] Appl. No.: 362,293

[22] Filed: Mar. 26, 1982

[51] Int. Cl.³ .............................................. H02H 7/122
[52] U.S. Cl. ........................................ 363/56; 363/75; 363/24
[58] Field of Search ................................... 363/22–26, 363/55, 56, 75, 82, 90–91, 133–134; 336/184, 188; 323/250, 251, 254, 290

[56] References Cited

U.S. PATENT DOCUMENTS

| | | | |
|---|---|---|---|
| 3,443,198 | 5/1969 | Wanlass | 323/250 X |
| 3,697,855 | 10/1972 | Kernick et al. | 363/56 X |
| 3,854,091 | 12/1974 | Knudsen | 323/254 X |
| 4,042,872 | 8/1977 | McLeod | 363/56 X |

Primary Examiner—Peter S. Wong
Attorney, Agent, or Firm—Freilich, Hornbaker, Rosen & Fernandez

[57] ABSTRACT

A method and apparatus is disclosed for detecting an impending saturation in nonlinear magnetic material for particular operating conditions, such as in a core of a power transformer $T_1$ of a switched-mode converter, in response to a varying magnetic field in a principal direction induced by a drive current through its primary winding with its axis aligned in the principal direction. A transverse flux sense winding (20) is used in monitoring the rate of change of flux density of a transverse magnetic field to produce a voltage proportional thereto. That voltage is compared in a comparator (22) with a predetermined threshold voltage characteristic of impending saturation of the core. The output of the comparator is used for controlling drivers (25) to prevent saturation of the switched-mode converter bias switching the drivers off alternately when the sensed voltage reaches the predetermined threshold set at the comparator (22).

6 Claims, 26 Drawing Figures

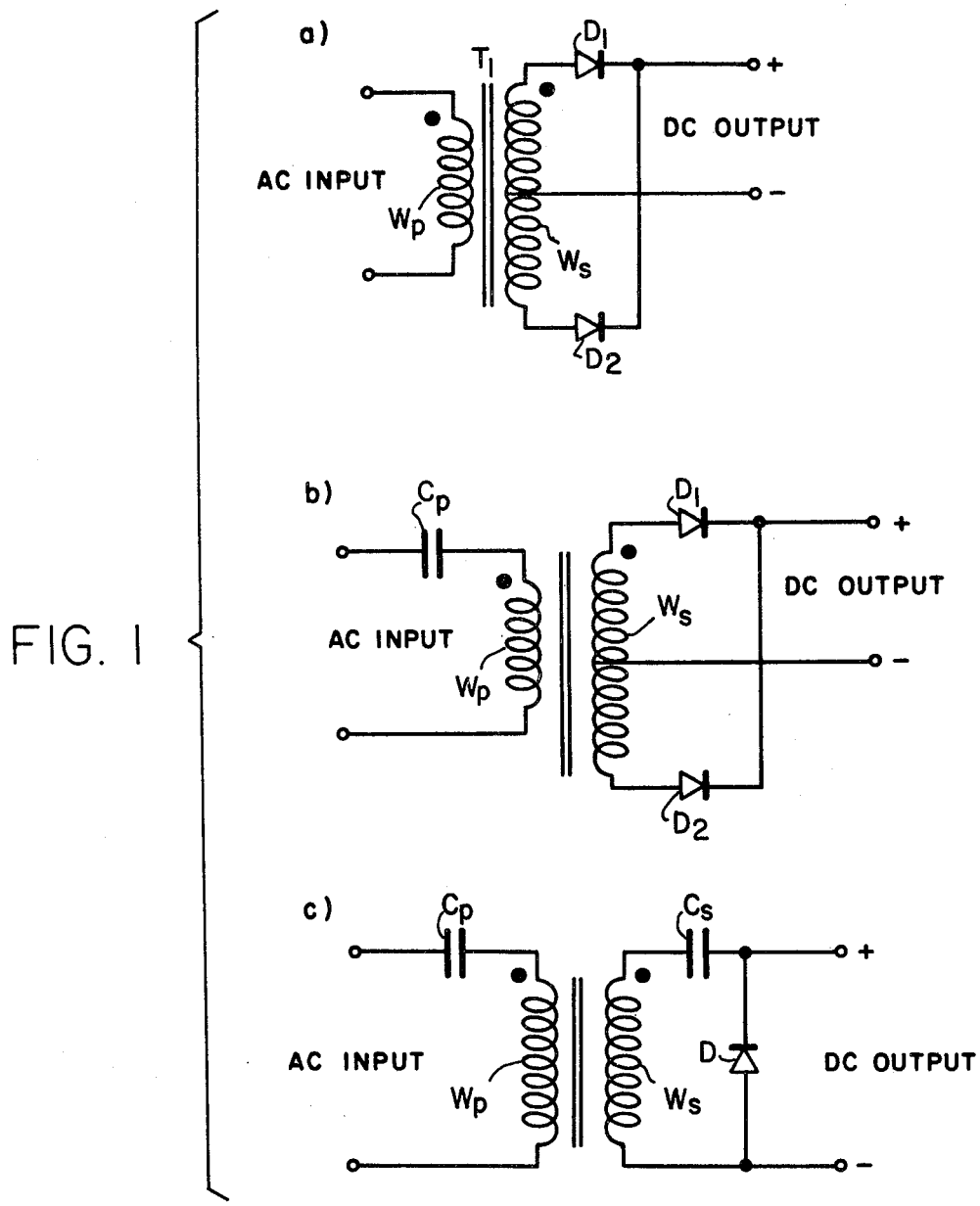
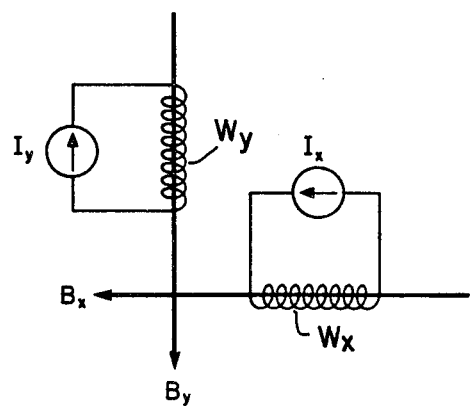
FIG. 1
FIG. 2

METHOD AND APPARATUS FOR DETECTING AND PREVENTING IMPENDING MAGNETIC SATURATION IN MAGNETIC MATERIALS

ORIGIN OF THE INVENTION

The work resulting in the present invention was sponsored by the Office of Naval Research, Washington, D.C., under Contract N00014-78-C0757. Subsequent analysis of data obtained by William M. Polivka is developed by him in a paper to be jointly presented by him, the inventor and Dr. Slobodan Cuk at the International PCI/MOTORCON '82 Conference, San Francisco, Mar. 29-31, 1982.

BACKGROUND OF THE INVENTION

This invention relates to a method and apparatus for detecting impending saturation in magnetic materials, such as, but not limited to, the core of power transformers in switched-mode power converters.

The undesirable saturation of electronic and magnetic devices has always been troublesome to circuit designers, because the boundaries of saturation impose limitations on the performance of almost any design. Saturation of most electronic devices is generally easy to avoid, because the physical quantities which are responsible for the saturation (voltages or currents) are nearly always quite accurately known and are easily controlled. The problem of magnetic saturation, on the other hand, has been much more difficult to overcome, owing to the lack of good practical way to measure the quantity which saturates the magnetic material, namely the flux density. The importance of finding a solution to this problem has become more acute with the advent of switched-mode power conversion because unexpected saturation of a high-frequency power transformer not only degrades the performance of the converter, but often induces spectacular catastrophic failures.

In order to take full advantage of available magnetic material and simultaneously meet minimum size and weight constraints, an isolation transformer of a dc-to-dc power converter is required to be designed to handle only ac currents. For a compact, efficient, and otherwise high-performance design, no net dc magnetization current can be permitted in the transformer, as that would cause the material to saturate.

Whole or partial saturation of the power transformer is undesirable for many reasons, but the most significant one is that it causes excessive and often destructive stresses on the power semiconductor devices in the converter. Unfortunately, unless one takes definite measures to prevent it, it is possible for a well-designed transformer to saturate as a result of transient excitations or naturally-occurring nonidealities of real devices. The saturation is caused by a dc magnetization current which builds as the result of a momentary volt-second imbalance on the transformer over one or more switching periods.

DESCRIPTION OF THE PROBLEM AND PASSIVE SOLUTIONS

Consider the particular transformer $T_1$ of FIG. 1a. The ac input at the primary winding $W_p$ could come from a common full-bridge or equivalent push-pull pulse-width modulated dc-to-dc converter. A dc output is derived from the secondary winding $W_s$ through rectifying diodes $D_1$ and $D_2$. If the average of the primary voltage is not zero, then a dc magnetization current will rise in the transformer and the core will eventualy saturate.

One technique to counter this cause of saturation is shown in FIG. 1b where the same reference characters are used for the corresponding elements as in FIG. 1a. The primary winding $W_p$ is ac-coupled to the input voltage by means of a dc-blocking capacitor $C_p$. Thus any average input voltage will appear across the capacitor and not across the primary winding. A steady-state volt-second balance will be maintained and therefore no net dc current can be present in the primary circuit.

A capacitor in series with the input, however, is not sufficient to prevent a dc magnetization current from saturating the core. A net dc current may still be introduced from the output. This will happen if the output diodes and winding resistances are not perfectly matched, or if there is an asymmetry in the primary voltage waveform. Although the possibility of dc saturation exists, it does not usually occur in practice, because the important parameters are usually reasonably well-matched and sufficient margin is usually designed into the transformer.

The only passive way to gaurantee that there will be no steady-state dc magnetization current is to ac-couple both input and output as shown in FIG. 1c where again the same reference characters are used to refer to the corresponding elements as in FIGS. 1a and 1b, the main difference being a dc-blocking capacitor $C_s$ in the secondary winding, and the use of only one rectifying diode, D. If there is more than one output, then they all must be dc-blocked.

However, even with ac coupling of the input and all the outputs, the possibility of saturation of the transformer $T_1$ still exists. This can occur if there is a sudden increase in input voltage, for example. A transient on the power-line can produce a large magnetization current which can last for several switching periods, which is ample time to saturate the transformer and damage the components.

The semiconductor devices can be protected by means of active current limiting on each switch, but this safeguard does not eliminate the requirement for the dc-blocking capacitors. The capacitors $C_p$ and $C_s$ are needed to prevent a steady-state dc magnetication current, which, if permitted, would force half of the switches to operate at current-limit all the time.

Clearly some sort of active compensation is needed to correct for these naturally-occurring mismatches and imbalances. This necessity becomes especially apparent at high power levels, where the magnetics have to be optimized for efficient power transfer, and thus can tolerate very little dc current.

ACTIVE SOLUTIONS

Several methods are available by which one may avoid saturation of the transformer without the need of a dc-blocking capacitor at each port. Some are quite obvious:

(1) Integrate the voltage on the transformer and maintain a volt-second balance by control of the drive symmetry. This very straight-forward approach requires an accurate integrator with its associated sensitive analog circuitry. In addition, a knowledge of the dc flux level is required; series integration yields only the ac flux excursion.

(2) Sum all the winding currents in the proper ratios to find the magnetization current and then have the control circuit work to minimize the average. Users of this very basic technique have to battle the fundamental problem of the resolution of small differences between large numbers. This is especially difficult to do for typical situations in which the winding currents are very much greater than the magnetization current.

In addition to these, there are several other diverse solutions reported in the literature. For example, F. C. Schwartz describes in his papers "An Unorthodox Transformer for Free Running Parallel Inverters," IEEE Transactions on Magnetics, vol. MAG-5, No. 4, December 1969, pp. 908-912, and "A 95 percent Efficient Regulating 500 Watt Full Bridge Parallel Inverter-Converter Module with an Internal Freequency of 20 kHz," IEEE Power Electronics Specialists Conference, 1978 Record, pp. 331-343, (IEEE Publication 78CH1337-5 AES), the use of a two-core transformer of uncut square-loop material. The two toroidal cores are prebiased by a dc current in auxiliary windings such that one of the two cores saturates first. In so doing, it generates a signal pulse which is used to turn off the transistors while the remaining unsaturated core supports the primary voltage.

W. J. Hirschberg describes in his paper "A New PWM Control TEchnique that Eliminates Transformer Unbalance Problems in Power Converters," Proc. Sixth National Solid-State Power Conversion Conference (Powercon 6), pp. F2.1-F2.4, May 1979, a "Twin Pulse Circuit" which desensitizes a converter against transformer saturation by virtue of an unconventional pulsewidth modulation system.

R. Patel describes in his paper "Detecting IMpending Core Saturation in Switched-Mode Power Converters," Proc. Seventh National Solid-State Power Conversion Conference (Powercon 7), pp. B3.1-B3.11, March 1980, a method in which one can detect impending saturation by the use of an unsymmetrically-gapped EE core.

R. Kuttner described a technique in his paper "Circuit Techniques for Eliminating Primary Current Unbalance in Push-Pull Converter," Proc. Seventh National Solid-State Power Conversion Conference (Powercon 7), pp. F2.1-F2.9, March 1980, which senses the switch currents and uses a tuned circuit to detect the presence of the fundamental component of the switching frequency in the primary circuit. If the magnetization current is zero, then the lowest frequency present is twice the switching frequency. The presence of a fundamental component indicates an unbalance: a manifestation of a dc magnetization current. The control circuit works to minimize this fundamental component.

D. Wilson describes a technique in his paper "A New Pulsewidth Modulation Method Inherently Maintains Output Transformer Flux Balance," Proc. Eighth International Solid-State Power Electronics Conference (Powercon 8), pp. D1.1-D1.5, April 1981, that uses both the primary voltage and primary current as inputs to a new pulse-width modulation circuit which maintains flux balance by the allotment of equal VI areas to alternate pulses.

OBJECTS AND SUMMARY OF THE INVENTION

An object of this invention is to provide a method and apparatus for sensing impending saturation of magnetic materials.

Still another object of this invention is to provide apparatus responsive to the sensing of an impending saturation for prevention of magnetic material saturation in switching converters.

In accordance with the present invention, a method of detecting an impending saturation in a magnetic material utilizes the interaction of two orthogonal magnetic fields in the material to provide a simple, direct and continuous measure of the increasing nonlinearity of the material to sense and, if desired, prevent impending saturation of the material due to an increase of one of the fields. More specifically, the method uses an orthogonal winding through the magnetic material. This signal can be used directly by a control circuit that produces the total flux, which is generally the circuit of the primary winding in the case of a transformer, to prevent saturation of the transformer magnetic material. More specifically, the transverse winding through the magnetic material is connected to a comparator which detects when the transverse winding voltage reaches a predetermined level indicative of total flux saturation (which may be calculated or determined empirically). The output of the comparator is then used to so control the circuitry that produces the total flux in the magnetic material as to prevent saturation of the magnetic material. In the case of the power transformer of a switching converter, the comparator toggles a flip-flop that controls the time during which power transistors of a switching converter conduct, thus switching the conduction of the power transistors before the power transformer saturates.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1a illustrates a conventional arrangement for a transformer of a power converter. Addition of a dc-blocking capacitor to the primary, as shown in FIG. 1b, guarantees steady-state volt-second, but does not prevent steady-state dc magnetization current. Series capacitors on both primary and secondary windings, as shown in FIG. 1c, guarantee zero magnetization current, but the transformer can still saturate in response to transients.

FIG. 2 illustrates the generation of two perpendicular magnetic fields of flux densities $B_x$ and $B_y$ generated by currents $I_x$ and $I_y$ in their respective coils.

DESCRIPTION OF PREFERRED EMBODIMENTS

Figure 3:
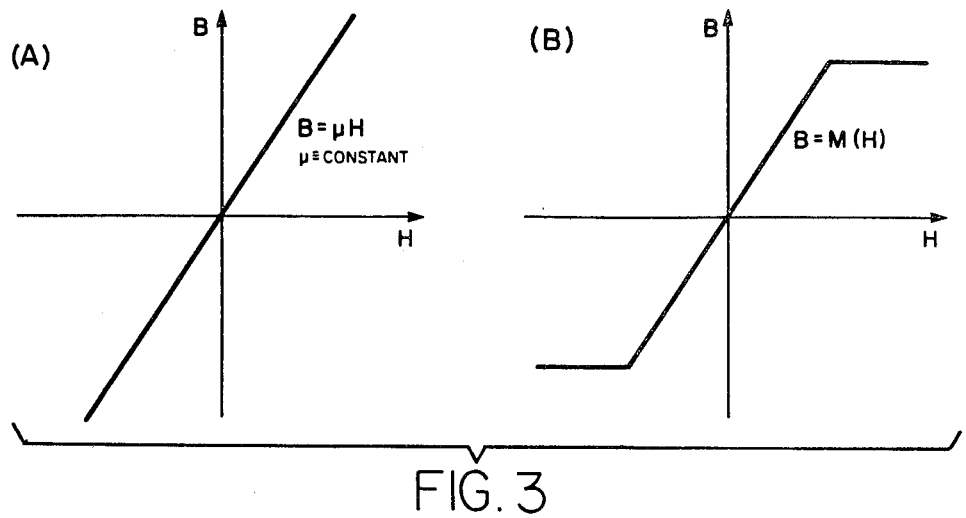
FIG. 3 illustrates in respective graphs (A) and (B) the relationship between flux density, B, and intensity, H, of a magnetic field in linear and nonlinear material.

The present invention utilizes an active method to detect impending saturation. This novel technique exploits the interaction of perpendicular magnetic fields to provide a simple, direct, and continuous measure of the increasing nonlinearity of the magnetic material without any elaborate devices or complex electronic circuitry. The interaction of two perpendicular fields in the material produces a signal whose magnitude is related to the total amount of flux in the material. In a switched-mode power converter, this signal can be used directly by the converter's control circuit to correct for any net flux offset. The entire sensing operation can easily be implemented with only one resistor and a single extra winding on a standard unmodified pot, RM, or U-type ferrite core. Implementation with E-type cores is accomplished with a small modification which does not effect the length of the magnetic path.

Many experienced designers of magnetics and power-processing electronics may be disturbed by the reference to "interactions between orthogonal magnetic fields." The conflict originates from the every-day common-sense conception of electromagnetism that attests the independence of perpendicular magnetic fields.

FIG. 2 shows two perpendicular (orthogonal) magnetic fields of flux density $B_x$, and $B_y$, which are generated by the currents $I_x$ and $I_y$ in their respective windings $W_x$ and $W_y$. If the fields are independent, then it is impossible for the field in the x-direction to in any way affect the field in the y-direction, even though they share a common point in space. The converse must be true also. This idea is certainly completely correct for linear media, which is the type most often preferred by designers, but it is well known that the magnetic materials which have the most interesting and useful properties are inherently nonlinear. That is, in general, super-position does not apply; a multiplication of the magnitude of the excitation will not necessarily multiply the magnitude of the response by the same factor; it is possible to have different responses for the same excitation and vice versa.

In some applications of magnetic materials, the nonlinearity of the medium is regarded as an undesirable nuisance—a defect which the designer mitigates by the introduction of air gaps into the magnetic path. These air gaps impose boundary conditions on the magnetic fields in the structure to give the external appearance of a more linear material. When this is done, the designer's understanding of linear electromagnetism can be applied successfully to the design process. The design of inductors falls into this category.

In other applications, the nonlinear effects may be less restrictive, easier to live with, or may even be exploited in particular designs. Magnetic saturation is an example of this type of nonlinearity. In these applications only the most salient features of the nonlinearity are considered in the design, and the problem is divided piecewise into regions of assumed linear behavior. This is the approach taken in the design of transformers, permanent magnets, magnetic memory devices, and self-oscillating power converters.

There is nothing wrong with either of these approaches to design. Clearly, most practical problems are completely intractable in the absence of such simplifying assumptions. Moreover, it is the designer's right and obligation to use the simplest model which is adequate for his purposes.

With this constant exposure to linearized problems, however, one may tend to forget the true nature of the working materials. It is easy to be led astray by the natural temptation to take relationships which were derived from linear models and to apply them incorrectly to phenomena which are governed exclusively by nonlinear processes. For this reason the foundations for the treatment of this topic of orthogonal fields should begin from first principles, with all assumptions and approximations explicitly stated and justified as they arise.

Magnetic fields are vectors which have both magnitude and direction. In this discussion, vectors are designated with an underline, as in B, whereas nonunderlined quantities refer to the magnitude only, and in this discussion all the fields are assumed to be uniform, continuous, and contained within structures of homogeneous isotropic media whose geometries do not change with time. Under these conditions, the following are always true.

Ampere's Law: $H = NI/l$       (1)

This equation gives the relationship between the magnitude of the magnetic field intensity, H, and the current I in one of the N turns of wire enclosed by the magnetic path of length l.

Faraday's Law: $V = NA(dB/dt)$ (2)

This is the relationship between the voltage V at the terminals of a coil of wire whose N turns enclose an area A, and the rate of change of flux density, B, perpendicular to that area.

In addition to equations (1) and (2) there remains one other relationship of importance, and that is the relationship of B to H. This relationship is of paramount importance, for it is the only one which depends on the medium. The degree of success of any analysis of magnetic phenomena depends heavily on one's ability to model the relationship between these two magnetic vectors.

In this discussion all dimensions will be measured according to the MKSA rationalized system which is now widely accepted, as it is part of the international standard (SI) system. In this section, the two field quantities have the following unit dimensions:

$H (\equiv)$ A ampere/meter $B (=)$ T (tesla)

where the symbol $(=)$ designates dimensional unit.

In free space the relationship between B and H is simple and linear:

$B = \mu_0 H$ (3)

The two vectors are colinear and their magnitudes are related by the scalar constant, $\mu_0$, the permeability of free space, which has the value $\mu_0 = 4\pi \times 10_m^{-7}$ (H henry/meter)

LINEAR MATERIALS

For the case of linear isotropic materials other than free space, the relation is like equation (3) but with a different value for the scalar constant:

$B = \mu H$ (4)

since we know that the two vectors are colinear, it is sufficient to write only the relationship between the magnitudes of the vectors if the direction is known, Thus, $B = \mu H$ (5)

is the simplified expression which will be used here. FIG. 3 illustrates in graph (A) this relationship for some arbitrary direction in a linear isotroapic material.

For nonlinear isotropic materials the B and H vectors, although colinear and independent of orientation, do not have their magnitudes related by a scalar constant as in (5). Instead, the relationship is described by some nonlinear operation. This idea can be written in a compact form as $B = M(H)$ (6)

where the operation M, whose argument is the magnitude H, is whatever may be required to model the desired nonlinearities. Graph (B) of FIG. 3 shows a fictitious nonlinear B-H characteristic without any hysteretic effects. For this case M is a single-valued function. It could be chosen to be a piecewise linear representation or a continuous representation, such as an infinite series; whatever is suitable for the situation. Equation (6) may, of course, be used to model the effects of hysteresis also, but at the hidden expense of a much more complicated M.

In working with magnetic materials, it is sometimes beneficial to think in terms of a cause-and-effect relationship. For the purpose of understanding the interactions of orthogonal fields in nonlinear media, it is helpful to think of H as the cause and B as the effect.

Figure 4:
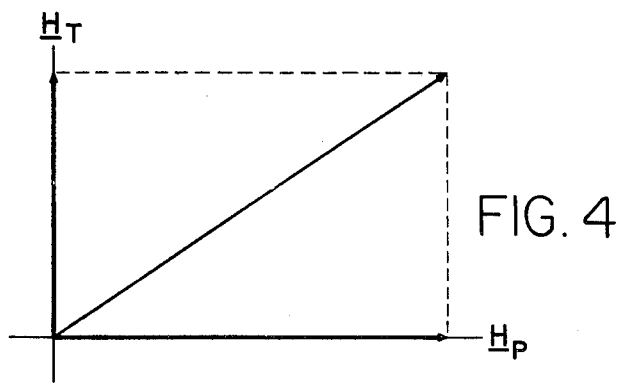
FIG. 4 illustrates the vector addition of two magnetic fields $H_T$ and $H_P$ to form an equivalent total field H.

Suppose there is a magnetic structure with two separate windings arranged to produce magnetic fields in two mutually perpendicular directions. Call one direction the principal direction and the other the transverse direction. A current $I_p$ in the principal winding will produce an H-vector, $H_p$, in the principal direction. Likewise, a current $I_T$ in the transverse winding will give rise to another field $H_T$ in the transverse direction. The two magnetic field vectors, $H_p$ and $H_T$, will sum as vectors to form the resultant vector H, which is the total magnetic intensity in the material. FIG. 4 illustrates this straightforward vector addition.

Figure 5:
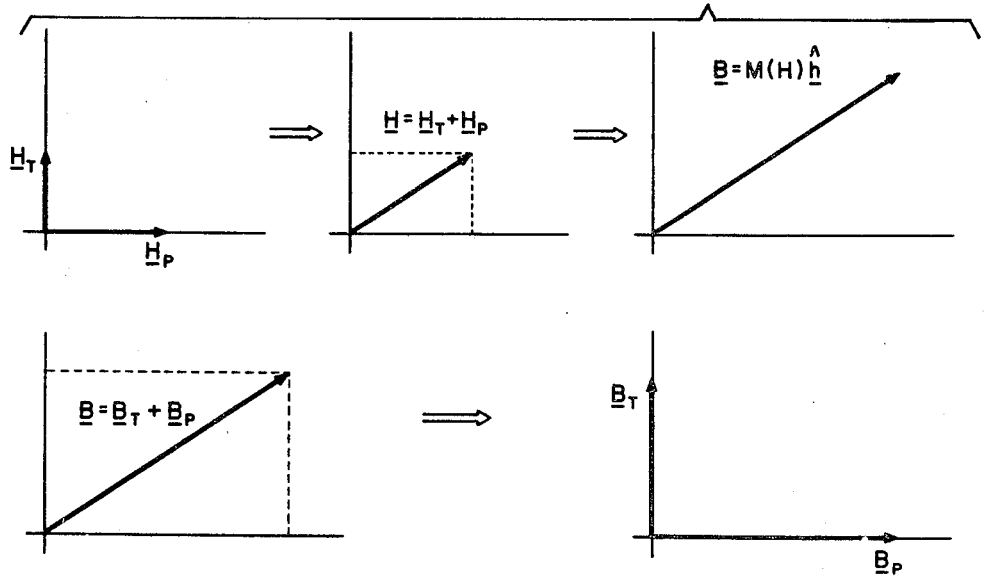
FIG. 5 illustrates in graphs a through e the cause and effect of perpendicular fields which depends upon the characteristics of the medium.

FIG. 5 shows how the idea of cause and effect can be used to deduce two orthogonal B fields from the two orthogonal H fields. In graph (a) are the principal and transverse H fields. Graph (b) shows how the original individual fields are replaced by the equivalent resultant field H. This in turn leads to the total resultant B field of graph (c) where the symbol h is a unit vector in the H direction. The notation in the figure emphasizes that the vector B is of magnitude M(H) and is in the direction of H. Graph (d) then shows how the total flux density vector B can be resolved into the sum of two orthogonal component vectors, $B_T$ and $B_p$. The equivalent resolution of B is shown in graph (e).

A key point to be made here is that owing to the nonlinearity of M, one must write for the general case:

$B_T = M(H_T)$ $B_P = M(H_P)$ (7)

The next paragraph demonstrates that equations (7) are true for nonlinear M.

One can easily derive the following relations from the geometry of FIG. 5.

$H = \sqrt{H_T^2 + H_P^2}$ (8)

$B = M(H) = \sqrt{B_T^2 + B_P^2}$ (9)

$B_T = \frac{M(H)}{H} H_T$ (10)

$B_P = \frac{M(H)}{H} H_P$ (11)

If the material happens to be linear such that $M(H) \rightarrow \mu H$ then from equations (10) and (11)

$B_T = \mu H_T$ $B_P = \mu H_P$ (12)

But if the material is nonlinear, say for example $$M(H) \rightarrow \mu H^2$$

then from equations (8) through (11)

$$B_T = H_T \sqrt{H_T^2 + H_P^2} \neq H_T^2 \quad (13)$$

$$B_P = H_P \sqrt{H_T^2 + H_P^2} \neq H_P^2$$

Thus, equation (7) is true except for the special case of linear materials.

Figure 6:
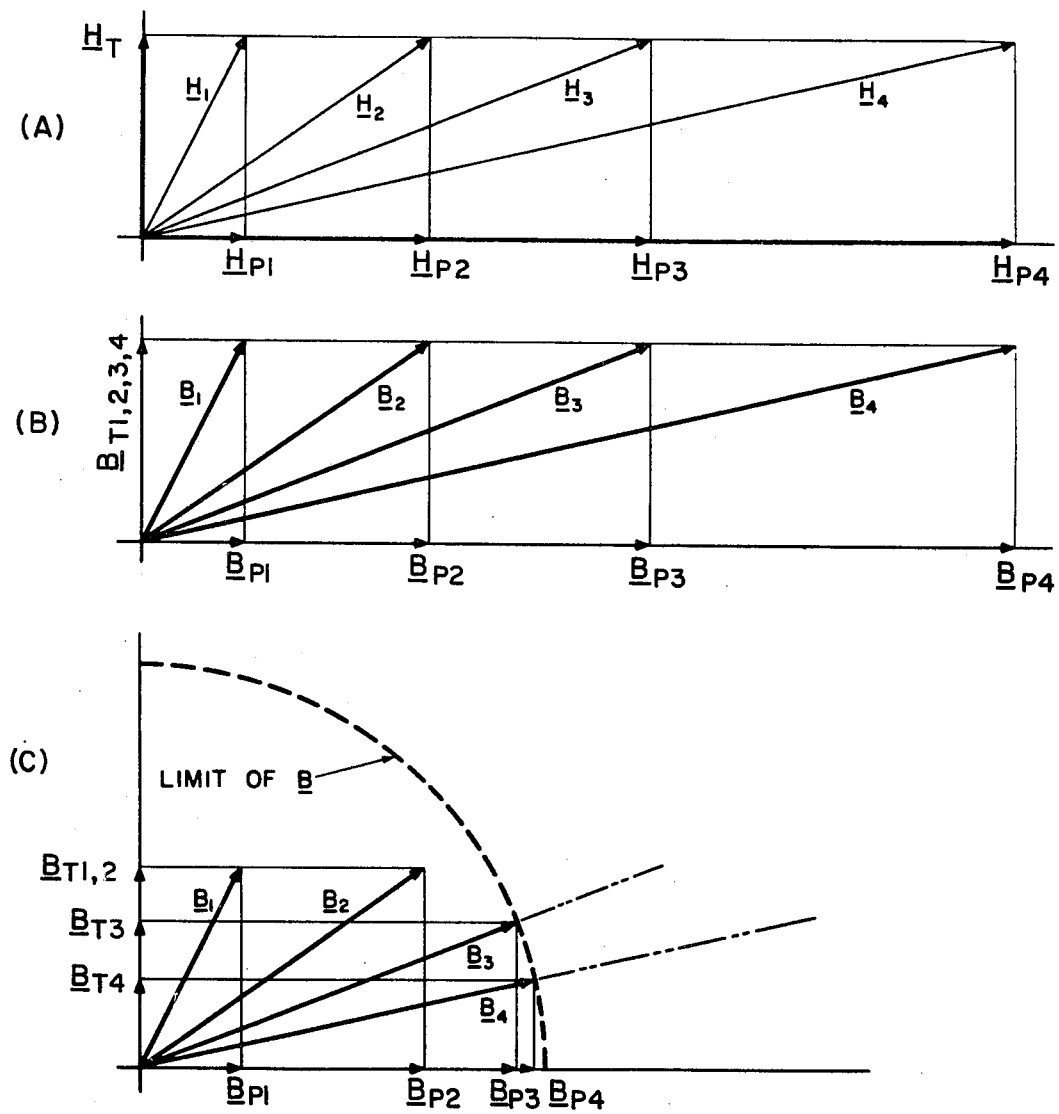
FIG. 6 illustrates that when $H_T$ is constant and $H_P$ varies, as shown in graph (A), a linear material will maintain a constant $B_T$, as shown in graph (B), but in a nonlinear material, $B_T$ will change as shown in graph (C).

Suppose now that the transverse current $I_T$ is constant such that $H_T$ is held constant. Let the principal current $I_P$ change with time. As the principal curent changes, $H_P$ will also change because of Ampere's Law. Graph (A) of FIG. 6 shows the effect of a changing $H_P$ on the resultant total H. As $H_P$ takes on the magnitudes $H_{P1}$, $H_{P2}$, $H_{P3}$, and $H_{P4}$, the magnitude and direction of H changes respectively to $H_1$, $H_2$, $H_3$ and $H_4$. This straight-forward vector addition can go on without limit as long as the material remains homogeneous. This restriction precludes any nonuniform saturation of the material which would have the effect of introducing air gaps in the magnetic path. Some nonuniform saturation is unavoidable in practice, but it is nearly always negligible for ferrites when they are operated within practical limits.

If the material were linear, such as the one characterized by graph (A) in FIG. 3, then the application of the method of cause-and-effect would yield the B vectors with the components $B_T$ and $B_P$ as shown in graph (B) of FIG. 6. The B's are in the same directions as their respective H's and the $B_T$'s are all the same magnitude. One would naturally expect this result from (12) since the material is assumed linear and $H_T$ is constant by design.

Now consider the nonlinear material of graph (B) in FIG. 3. As $H_P$ increases with $H_T$ constant, the magnitude of B increases in exactly the same way as for the linear material until it is limited by the abrupt nonlinearity of hard saturation. This situation is illustrated in graph (C) of FIG. 6. Note that the B's are all in the same directions as their respective H's, but as the magnitude of B becomes restricted, both $B_P$ and $B_T$ must change accordingly. Thus it is easy to see from the figure that although $H_T$ is constant, $B_T$ must change with $H_P$ and $B_P$. This is how orthogonal magnetic fields can interact. They are coupled not in the conventional manner by their spatial orientation, but rather by the nonlinearity of the medium. The $B_T$ and $B_P$ are no longer independent. In the nonlinear region, where B is at its limit in graph (C) of FIG. 6, any change in $B_P$ must be accompanied by a change in $B_T$. This requires, of course, that B change directions, and that occurs because $H_P$ changes with $B_P$ according to equation (11).

Because the fields do interact, they are not truly orthogonal in the strict mathematical sense. However, we will continue to use the term as a synonym for "perpendicular," since the precedent has been set in earlier literature on the subject.

If there are $N_T$ turns on the transverse winding, then a transverse voltage $v_T$ will be produced according to Faraday's Law as $$v_T = N_T A_T (dB_T/dt). \quad (14)$$

Figure 7:
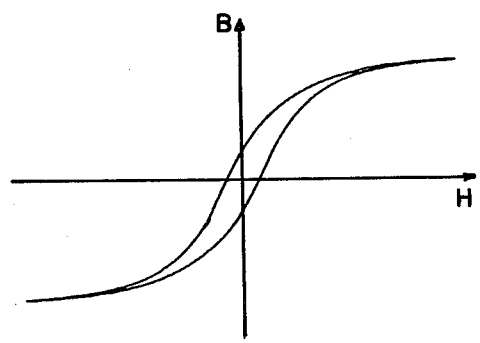
FIG. 7 illustrates in a graph the measured characteristics of a typical nonlinear material as commonly used in finite cores.

Hence the transverse voltage $v_T$ is a measure of the rate of change of $B_T$, which is in turn a measure of the increasing nonlinearity of the material. This suggests the possibility of the use of the transverse voltage to detect the impending saturation of a transformer. Real-life materials (even the so-called square-loop ones) do not saturate as abruptly as the fictitious material illustrated in graph (B) of FIG. 3; there is always a gradual increase of nonlinearity as the material comes closer to saturation. This is illustrated in FIG. 7, which shows the B-H characteristic of a typical ferrite material, for which the technique of the present invention seems best suited.

The transverse flux density $B_T$ indicates the degree of nonlinearity of the material, and hence is a measure of its instantaneous position on the B-H characteristic loop. In practice, however, the absolute flux density is not measured directly, but only its rate of change is known, being directly proportional to the transverse voltage $v_T$ given by equation (14). Fortuitously, this restriction is not a disadvantage, but rather an advantage, simply by virtue of the way transformers are commonly used. In practice it is the principal voltage (primary or secondary voltage) and not the principal current (magnetization current) which is the more accurately known and controlled quantity. After all, if it were easy to measure the magnetization current, one would merely use that signal to limit the B-H excursion, and the problem of saturation would be solved. The principal voltage $v_P$ is related to the rate of change of $B_P$ by Faraday's Law just as $v_T$ is related to the rate of change of $B_T$. Thus, the increasing nonlinearity of the material can be ascertained just as well from the ratio of $v_T$ to $v_P$ as it could be from $B_T$ alone. For example, if the material happened to be linear in some region, then $B_T$ would not change and $B_T$ would be zero, which would indicate no nonlinearity. Moreover, since in most switching converter applications $v_P$ is constant over the time interval when the transformer is energized, the degree of nonlinearity can be deduced from $v_T$ alone.

Figure 8:
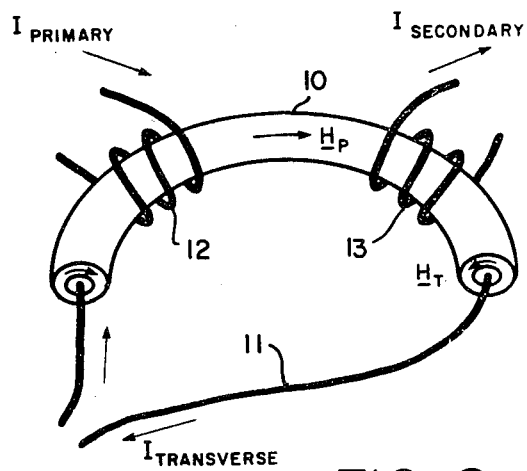
FIG. 8 illustrates a hypothetical hollow toroid with principal and transverse windings. The two magnetic fields, $H_T$ and $H_P$, are assumed perpendicular everywhere within the structure.

The problem to be addressed now is how to induce a transverse field in the structure of a transformer. FIG. 8 is a cut-away view of a fictitious idealized hollow torroidal transformer core 10 with a single-turn transverse winding 11, a primary winding 12, and a secondary winding 13. Here the principal current is the familiar magnetization current, which, according to the directions assigned in the figure is just $$I_P = N_1 I_{Primary} - N_2 I_{Secondary} \quad (15)$$

where $N_1$ and $N_2$ are the number of primary and secondary turns, respectively. This is the quantity NI used in Ampere's Law. It is clear from the cylindrical geometry of this structure that the principal and transverse fields are everywhere mutually perpendicular. (This idealization is slightly flawed for an actual physical structure of this type, because the wires of the transverse winding must somewhere penetrate the wall in order to be accessible.) Cores of this type have actually been built by others for a variety of different purposes related to the use of orthogonal fields.

Figure 9A:
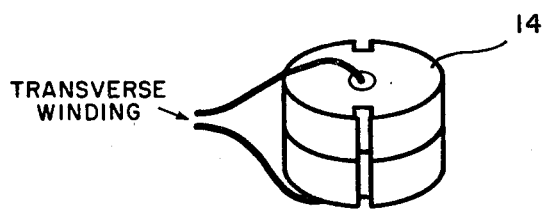
FIGS. 9a and 9b illustrate different arrangements for achieving a toroid with principal and transverse windings.
Figure 9B:
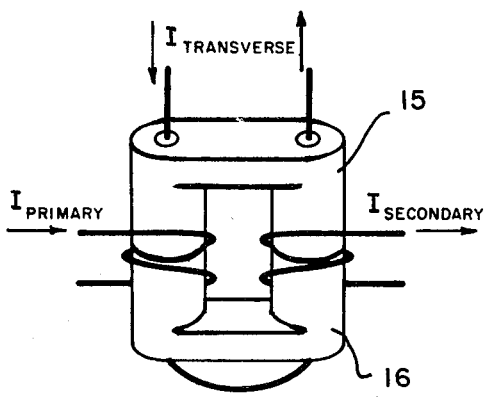

In a more practical vein, it is relatively easy to find standard off-the-shelf ferrite parts with holes already in the right places for transverse windings. FIG. 9a shows the implementation of a transverse winding on a standard pot core 14, and FIG. 9b shows how it may be used with a set of Ferroxcube U64 cores 15 and 16.

It has been established that orthogonal fields can indeed interact. Furthermore, a motivation and a philosophy are in place to exploit this phenomenon as a saturation detector for transformers. The next step, then, is to analyze this interaction to better understand how it may be used effectively to avoid saturation in real-life power transformers.

As a first approach to any mathematical treatment, it is useful to obtain a qualitative picture of the expected results. Assume that a pure, symmetrical, ac voltage (dc-blocked) is applied to the primary of a transformer, and that any effects of hysteresis are negligible. Under these assumptions and with a constant $H_T$, FIG. 10 illustrates the relationship between $B_P$ and $B_T$ for specific instants of time for the nonlinear characteristics shown in graph (B) of FIG. 3.

Several salient features of the response on the transverse winding are now apparent. As $B_P$ swings positively and negatively along the horizontal axis, the symmetry of the geometry gives the same $B_T$ for both positive and negative excursions of $B_P$. Thus it is easy to see that the fundamental frequency of the signal on the transverse winding is exactly twice that of the ac signal on the primary (principal) winding. This same sort of frequency-doubling is observed when a signal is full-wave rectified (another nonlinear process). Note, however, that nothing has been said about the relative shapes of $v_P$ and $v_T$ as functions of time.

It can also be seen from the figure that $B_T$ decreases in the positive transverse direction as $B_P$ increases in magnitude. If the direction of the transverse current were reversed to change the direction of $H_T$ and $B_T$, then $B_T$ would decrease in the negative direction, which is equivalent to an increase in the positive direction. Thus the polarity of $v_T$ would change if the transverse current were reversed.

Figure 10:
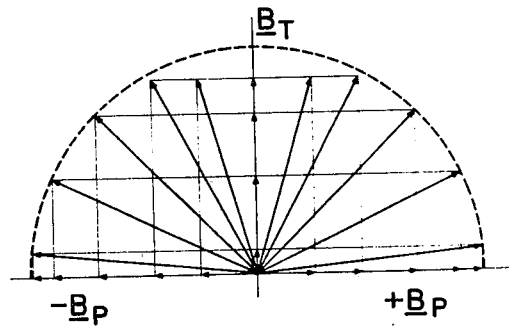
FIG. 10 illustrates the locus of the total B vector for the ideal nonlinear material characteistic shown in graph B of FIG. 3.

One more important attribute can be predicted from FIG. 10. If $B_P$ changes at a constant rate, then $B_T$ changes more rapidly as $B_P$ gets closer to the saturation limit. Thus, one should expect the voltage on the transverse winding to increase monotonically in magnitude if $B_P$ varies linearly with time.

Figure 11:
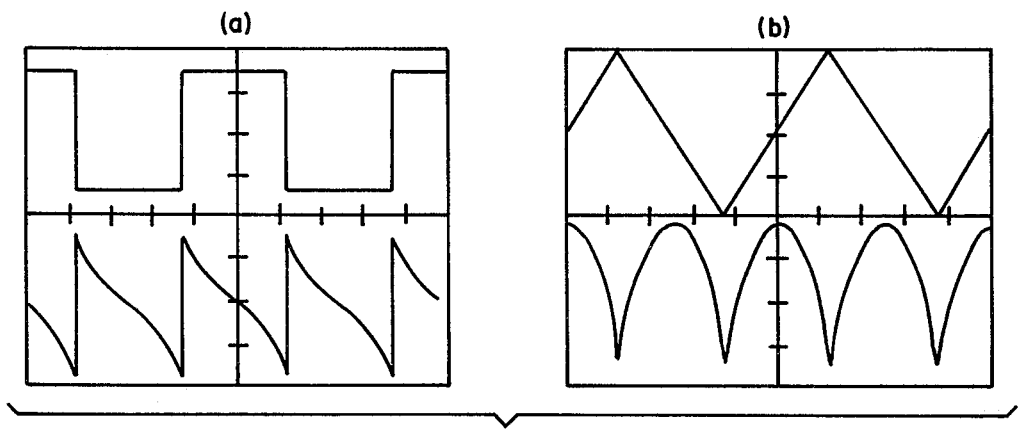
FIGS. 11a and 11b illustrate sets of graphs for principal and transverse voltages and flux densities for two different excitations, with principal quantities in the upper graph of each set and transverse quantities in lower traces.

The example described above for an ideal material was implemented on a real ferrite core with the B-H characteristics of FIG. 7. Results for square voltage waveforms are shown in FIG. 11. The set of graphs (a) in FIG. 11 is of the principal and transverse voltages $v_P$ and $v_T$; respective flux densities (obtained by integration of the voltages) are shown in the set of graphs (b) of FIG. 11. Scale factors are immaterial because only the shapes are of interest here.

The sets of graphs in FIG. 11 are illuminating because the principal flux density varies at a linear rate owing to the square-wave drive. Thus the time axis of the set of graphs (b) is directly proportional to $B_P$, and hence the transverse flux density at the bottom of the graph traces the relationship of $B_T$ to $B_P$. If the material had the ideal piecewise-linear characteristic of graph (B) in FIG. 3, then the locus of $B_T$ would consist of repetitions of parts of semicircles with flat tops, as shown in FIG. 10.

The normalized quantity, called the magnetic tansfer ratio (MTR), is defined to be $$MTR = v_T/v_P \qquad (16)$$

and is a function of the principal flux density, $B_P$. The MTR can be easily determined from one simple measurement on a sample core of a particular material and geometry.

Several MTRs occur for different bias currents. The variations in the MTR which result from changes in transverse bias, however, make up only a part of the total picture. Several parameters other than transverse bias are subject to change, and while these will not effect the general theory, they will effect changes in the characteristics of the material, whose peculiar nonlinearities determine the particular response. Owing to the possibility of wide variations in the several parameters which are involved in the description of the characteristics of magnetic materials, it is impossible to construct a simple model that is very accurate and at the same time useful for design purposes. The most practical and prudent course for a designer to take is not to attempt to calculate every minute detail of the response, but rather to know the trends and the bounds of the variations in the response as a result of expected changes in the operating conditions. This knowledge, reinforced by the understanding which comes from the general analysis, will lead to a sound design.

Figure 12:
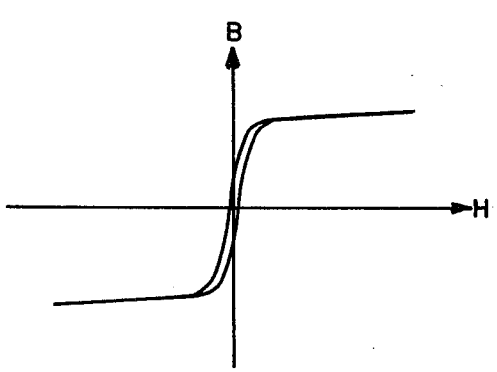
FIG. 12 illustrates the B-H characteristic of an RM10 core of H7Cl material.
Figure 13:
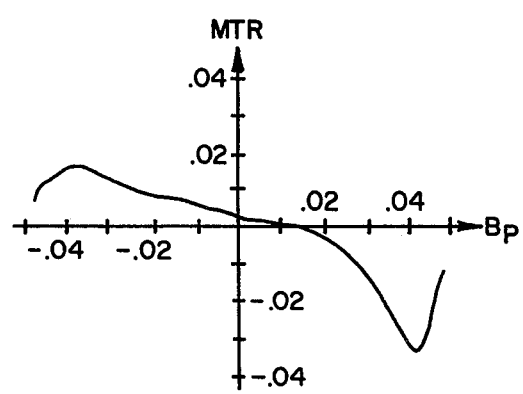
FIG. 13 illustrates the magnetic transfer ratio (MTR) for the characteristics of FIG. 12.

MTR measurements of a TDK RM10 core of H7C1 material having a B-H characteristic shown in FIG. 12 are presented in FIG. 13. This core is similar in structure to the pot core depicted in FIG. 9. The core was excited with an ac-coupled square-wave voltage at a freuqency of 30 kHz on a principal winding of five turns. The transverse field was applied with a 100 mA constant current source on a single turn transverse winding. Flux densities were obtained by integration of the voltage on a single turn and division by the appropriate cross sectional area. An ac clip-on current probe measured the principal current and a dc ammeter monitored the transverse current. A Tektronix 7854 digital processing oscilloscope was used to acquire and process the data numerically.

Although this instrument offers obvious advantages over other more conventional means of measurement, the use of such a highly sophisticated device is by no means necessary to obtain data for design. The same information obtained here digitally for research purposes may be obtained in real time with conventional analog instrumentation. In fact, the latter method may ultimately be preferable for actual design purposes.

The designer is most interested in the transverse voltage $v_T$, which is just the MTR multiplied by $v_P$. If $v_P$ is symmetrical and pulse-like with constant magnitude (nearly always true in dc-dc power converters), then $B_P$ will be directly proportional to time. Thus the transverse voltage as a function of time will be an exact replica of the MTR repeated at twice the frequency of $v_P$. Therefore this characteristic may be easily observed with conventional instruments, and the data can be taken on power transformers in situ.

The B-H characteristic shown in FIG. 12 was measured on the principal winding. Although this is not the actual intrinsic characteristic of the material owing to the presence of nonuniform fields within the structure, it is assumed to be adequate for the purposes of this study. FIG. 13 shows the MTR measured for the same excitation used for the measurement shown in FIG. 12. Since both $v_T$ and $v_P$ were measured with respect to a single turn, the MTR given here is normalized to the equivalent of a single turn on both the principal and transverse windings. Owing to magnetic hysteresis, the material has different dynamic properties for increasing and decreasing fields: this effect is manifested in the asymmetry of the MTR. Probably the most notable feature of FIG. 13 is that the magnitude of the MTR, and hence the transverse voltage, does not increase without bound, as $B_P$ gets larger, but rather has a definite limit.

It should be mentioned that since these are only ac measurements, the absolute magnitudes of the flux densities are unknown, and only their ac variations have been determined by integration. It has been assumed, however, from the symmetry of the B-H characteristic, that there is negligible dc flux offset in the principal direction. Thus, the midpoint of the ac flux excursion has been declared to be zero tesla in these plots.

Ferrite materials are commercially available in many different compositions, and each is distinguished from the others by a unique B-H characteristic. It is only natural, then, that the MTRs of different ferrites should in some way reflect these fundamental differences between the individual materials.

Figure 14:
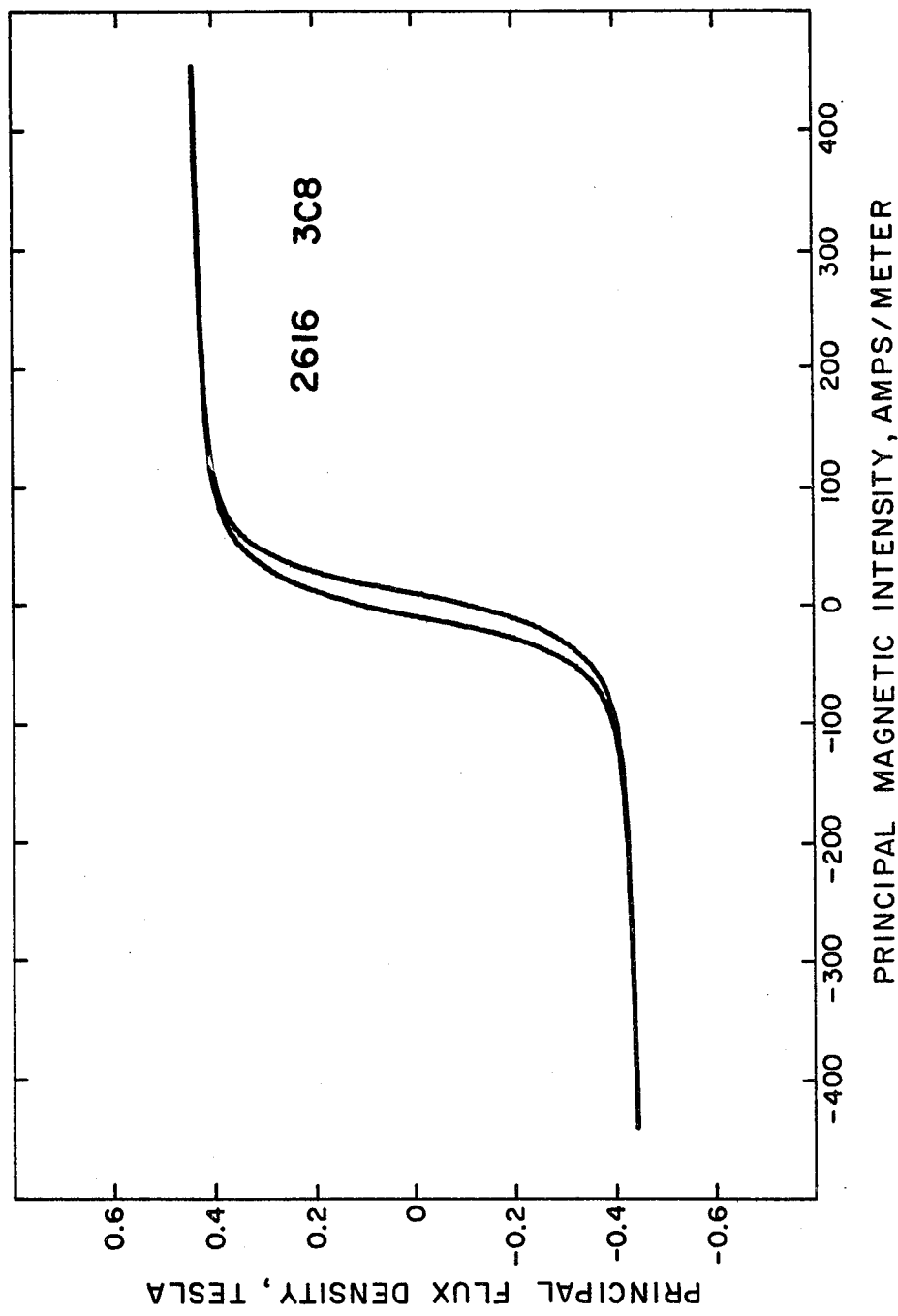
FIG. 14 illustrates in graph (a) the principal B-H characteristics of an RM10 core of H7C1 material for comparison with the principal B-H characteristics of a 2616 pat core of 3c8 material.

Consider the two measured B-H characteristics in FIG. 14, for example. The data for the curve in graph (a) was taken from the TDK RM10 core of H7C1 material which has been discussed previously. The curve in graph (b) was measured on a Ferroxcube 2616 pot core of 3C8 material. Aside from the difference in maximum flux density, the two curves are quite unalike in that they have distinctly different shapes. The H7C1 material of graph (a) has nearly a straight-line characteristic below the knee of the curve, but it begins to bend rather sharply with increasing $H_P$. In contrast to this behavior is the 3C8 material in graph (b), whose characteristic is rather S-shaped below the knee, and then curves gradually as it begins to saturate. The gradual S-shaped bending observed in the B-H characteristic of 3C8 results in an MTR which is quite remarkably different from that of the H7C1 material. The two MTRs are compared in FIG. 15.

Figure 16:
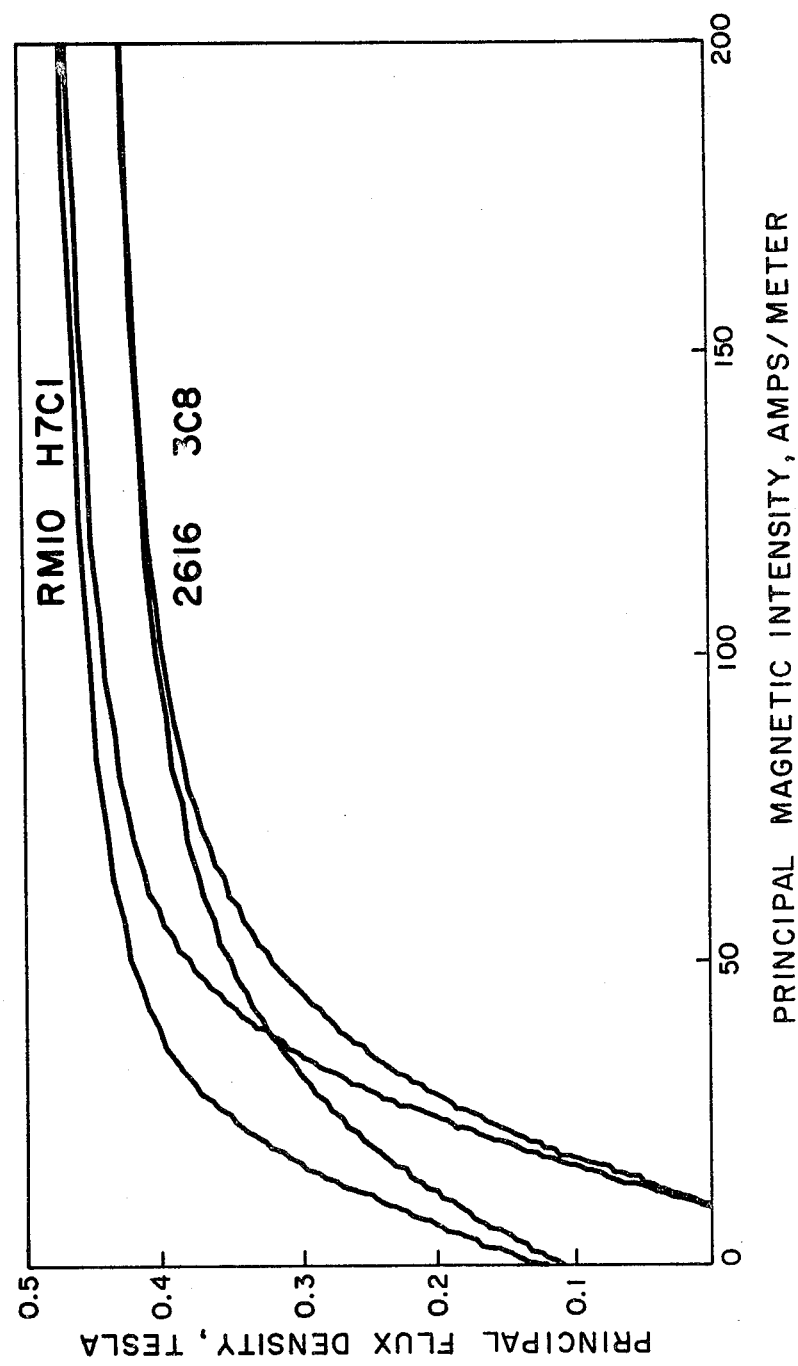
FIG. 16 illustrates a magnified first quadrant comparison of the B-H characteristics of FIG. 12. The waviness of the curves is a result of digital processing the data for recording.

FIG. 16 shows a magnified detail of a comparison of the two B-H characteristics in the first quadrant. The differences in the curvatures in the vicinity of the knees of the curves are apparent. A material with a sharper curvature in its B-H characteristic generally has a greater MTR.

Figure 15:
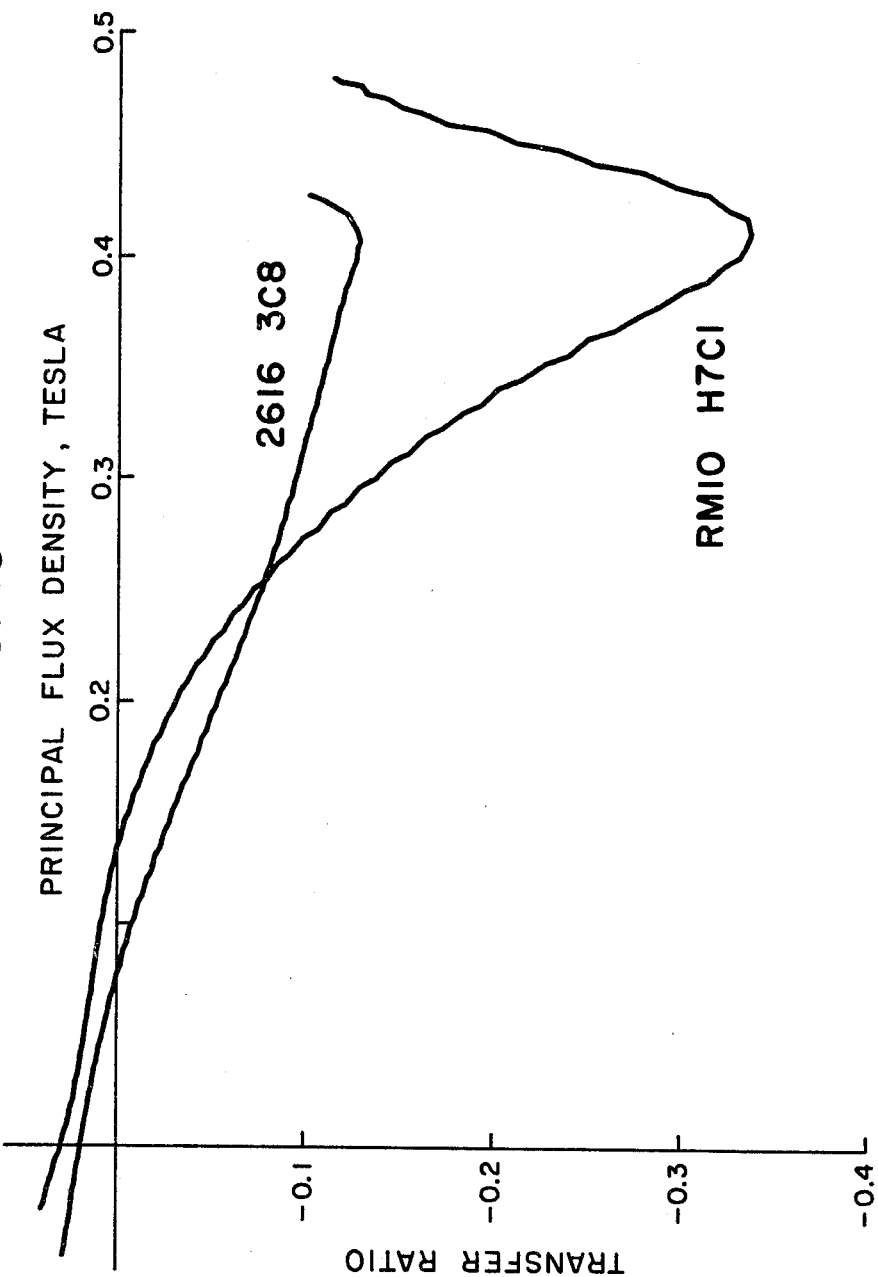
FIG. 15 illustrates for comparison the MTRs associated with the B-H characteristics shown in FIG. 14. Transverse current is 100 mA in one turn.
Figure 17:
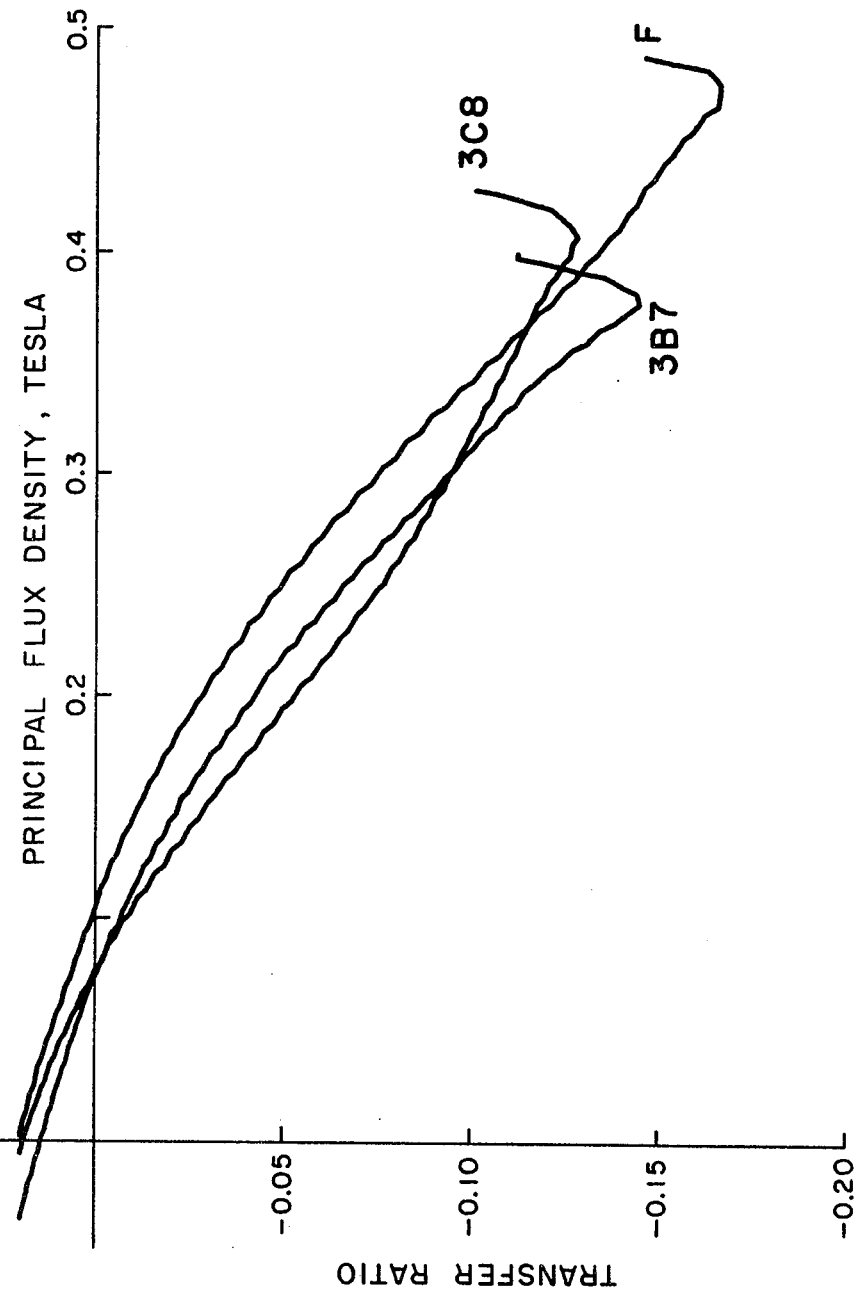
FIG. 17 illustrates the MTRs of three 2617 pat cores of different materials 3B7, 3C8 and F with a transverse current of 100 mA on a single turn to show the lesser effect of material as compared to the effect of core configuration shown in FIG. 15.

The fact that the two MTRs in FIG. 15 are measured on cores of slightly different geometries has little to do with the differences in the shapes of the curves. For another comparison, refer to FIG. 17 which shows the MTRs for three 2616 pot cores of three different ferrite compositions: Ferroxcube 3C8 and 3B7 and Magnetics, Inc. F material. One can deduce from the figure that the 3B7 and F materials have B-H characteristics with approximately the same shape, but the F material saturates at a higher flux density than the 3B7. Both these materials have characteristics which are more linear below the knee than 3C8, but not nearly as linear as H7C1.

Figure 18:
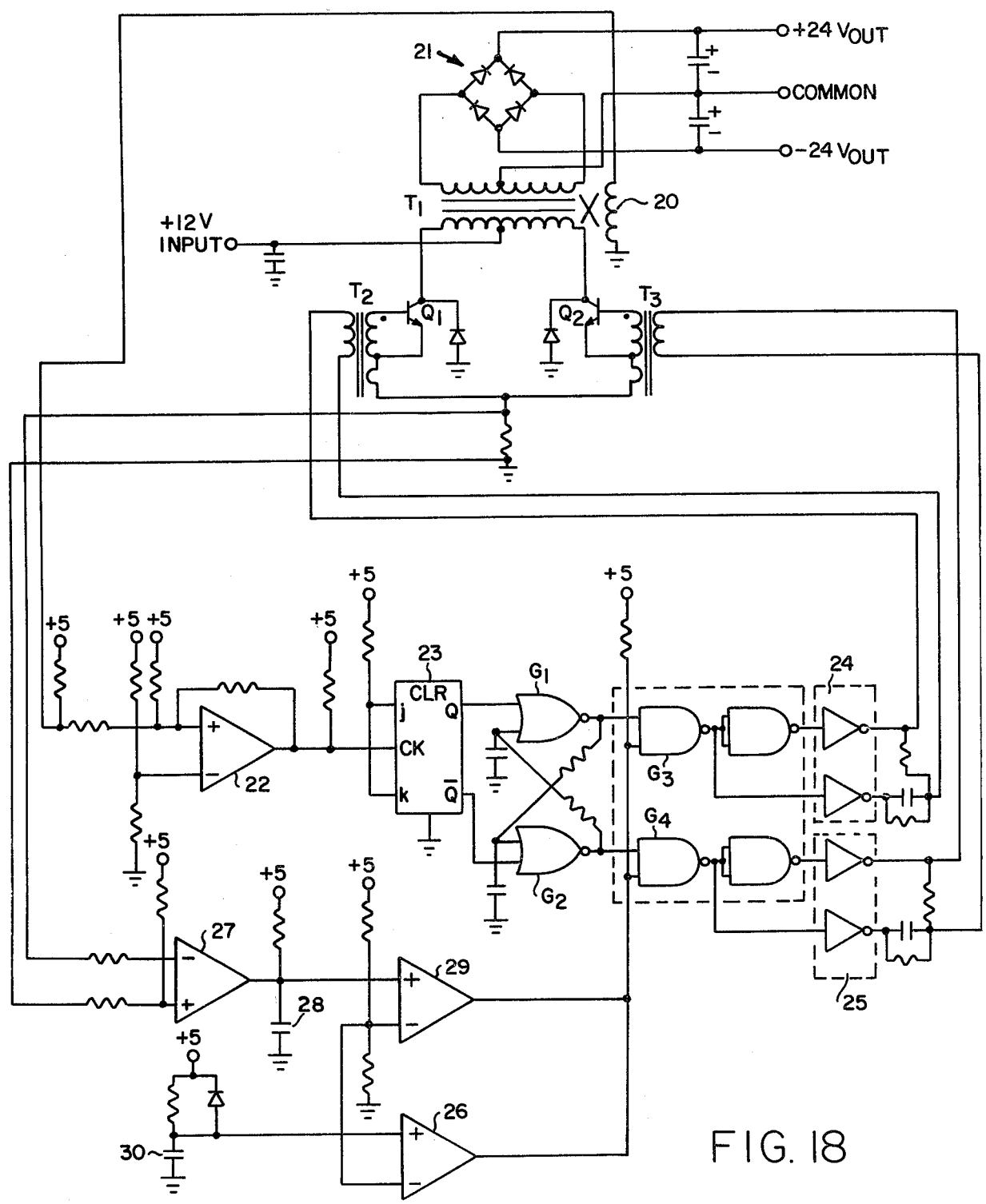
FIG. 18 is a schematic for a 100 watt free-running push-pull power converter using the technique of the present invention for detecting and preventing impending magnetic saturation in the magnetic material of the core for a power transformer.

FIG. 18 discloses a practical circuit which uses an orthogonal winding 20 to sense the flux in a power transformer $T_1$. The circuit is for a relatively low power (100 W) free-running push-pull converter which depends on the transverse voltage to toggle its two power transistors $Q_1$ and $Q_2$ as impending saturation of the power transformer core is detected. This converter, running open loop, illustrates the simplicity of the idea in a straightforward and uncluttered manner. The circuit is purposely arranged to place the power converter in the upper half of the figure, and the control and protection circuits in the lower half of the figure. The power transistors are turned on and off alternately through switching transformers $T_2$ and $T_3$. Current sensed across a common emitter resistor is used in the control circuit.

Referring now to the upper half of FIG. 18, the purpose of the converter is to take a dc input, nominally 12 volts from a storage battery or automobile electrical system, and provide positive and negative dc outputs at approximately 24 v, twice the input voltage for use by an audio power amplifier. The input voltage is "chopped" by the two power transistors $Q_1$ and $Q_2$ which alternately switch on and off to deliver a square wave of $\pm 12$ volts to the primary of the power transformer. The primary voltage is stepped up by the 1:2 turns ratio of the power transformer and full-wave rectified by a diode bridge 21. Since precise regulation of the output voltages is not required for this application, neither inductive energy storage nor pulse-width modulated control is needed. The absence of these requirements permits this extremely simple power supply to be highly efficient and very densely packaged.

The schematic of the control circuitry is shown in the bottom half of FIG. 18. Bias voltages ($+12$ v and $+5$ v) are derived from the input voltage of 12 v in a conventional manner. The control circuit is comprised of a comparator 22, one flip-flop 23, two sets of drivers 24 and 25 for the power transistors, and some nominal protection circuitry. The comparator trips when the transverse voltage reaches approximately $-1$ volt to toggle the flip-flop and complement the power transistors. At an input voltage of $+12$ volts, each transistor is on and off for about 16 s. The power transformer therefore receives a squarewave of about 30 kHz.

Coupling the flip-flop 23 to the drivers 24 and 25 is a zero-overlap circuit comprised of two NOR gates $G_1$ and $G_2$ cross coupled by RC circuits to assure that only one NOR gate can possibly turn on one of a pair of NAND gates $G_3$ and $G_4$. These NAND gates turn the drivers on and off. Each is followed by a NAND gate which functions simply as an inverter in order that the drivers will provide push-pull drive of the pulse transformers $T_2$ and $T_3$. It should be noted that an RC differentiating circuit is included between the drivers and the pulse transformers to provide sharp pulses to turn the power transistors on and off. When a transistor is turned on, a single turn winding in series with the secondary winding of its pulse transformer couples a fraction (such as one tenth), of the collector current into the base to hold the transistor on until the associated driver and its differentiating circuit provides a sharp negative pulse on the base of the transistor to turn it off. A resistor bypasses the capacitor in the RC differentiating network to provide current that will saturate the pulse transformer when it is off.

The gates $G_3$ and $G_4$ are provided to hold the drivers off under two conditions: when power is first turned on, using a comparator 26; and when current sensed across the common emitter resistor of the power transistors $Q_1$ and $Q_2$ exceeds a predetermined level using a comparator 27. The "current sense" voltage is compared to a reference, and when it exceeds a reference voltage, a capacitor 28 is quickly discharged to disable the NAND gates $G_3$ and $G_4$ through a comparator 29 until the emitter current is reduced. The capacitor 28 provides some hysteresis so that a condition will not be reached where the closed loop through the comparator 27 will oscillate. That capacitor will also hold the gates disabled when power is turned on, but for that purpose a larger capacitor 30 is employed. Once power is turned on, that capacitor charges slowly, and when its charge exceeds a threshold level, it will enable the NAND gates $G_3$ and $G_4$ through the comparator 26.

The transverse flux sense winding 20 presents a negative voltage to the comparator 22 that is proportional to the flux of the power transformer core. When it exceeds a predetermined threshold near the saturation level of the core, it causes a negative step voltage to be produced at the output of the comparator 22. That negative step triggers the flip-flop 23, a J-K flip-flop connected to operate as a T-type flip-flop. Assuming the flip-flop is in a state so that the $\overline{Q}$ output is high, the capacitor of the RC network coupling the output of the gate $G_2$ to the gate $G_1$ is low, so the output of the gate $G_1$ is high to enable the gate $G_3$ while the gate $G_4$ is disabled. When the flip-flop is triggered, both inputs to the gate $G_2$ will be low, but the output of the gate $G_4$ will not be high until the RC network coupling its output to the gate $G_1$ is charged. This delays enabling the gate $G_4$, but with the Q output of the flip-flop high, the output of the gate $G_1$ goes low immediately to disable the gate $G_3$. In that manner the gate coming on is delayed while the gate going off shuts off immediately. This zero overlap feature, with dead time between the turning off of one gate and turning on the other assures that both power transistors will not ever conduct at the same time.

Figure 19:
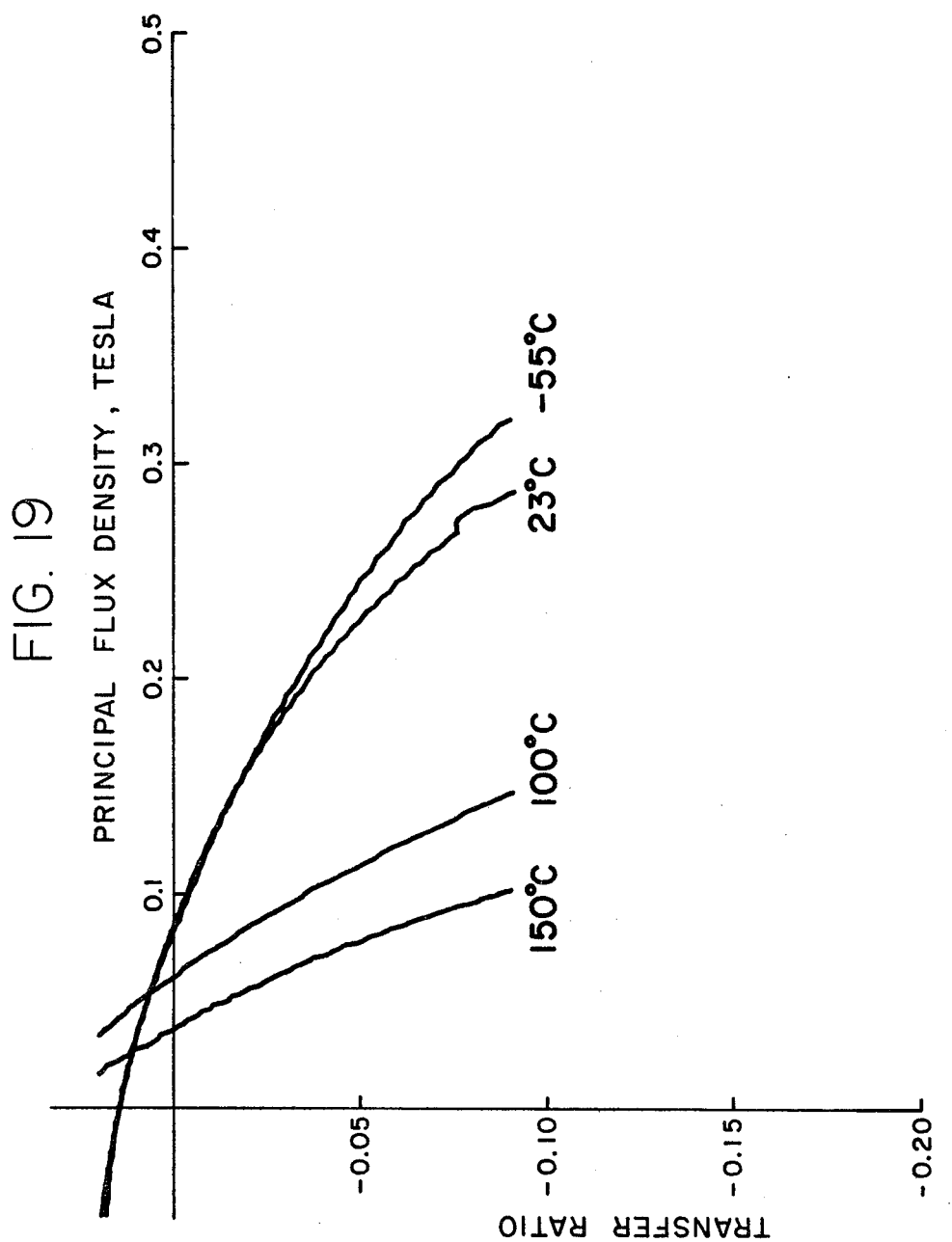
FIG. 19 illustrates MTRs measured on the working power converter of FIG. 18 at different core temperatures to show greater effect of temperature on the MTRs.

To measure the thermal performance of uncompensated sensing, the transformer was detached from the rest of the assembly and was heated and cooled from 150° C. to −55° C. FIG. 19 shows the MTRs measured on the transformer while it was operating over these temperature extremes. The MTRs are not shown in their entirety, but rather are truncated close to the ends of their actual excursions. The last few data points were not parts of the genuine MTR owing to the ever-present parasitic voltage spikes at the transition points; therefore, to avoid confusion they were not plotted. Note from the maximum flux densities shown in the figure that this design is a rather conservative one, as the room-temperature flux density is limited to less than 0.3 tesla. As the MTR increases in magnitude with increasing temperature, the comparator causes the power tansistors to toggle sooner, and consequently, the converter runs at a higher frequency. At 150° C. the comparator's trip-level corresponds to a maximum flux density of about 0.1 tesla, and the converter operates at approximately 70 kHz from a 12 volt supply.

From the foregoing, it is evident that the transverse voltage, $v_T$, can be monitored to detect an impending saturation of magnetic material, such as a core in a power transformer of a switched mode power converter. More specifically, a predetermined level of the transverse voltage just before total flux saturation can be calculated or determined empirically. By comparing the voltage $v_T$ with this predetermined level, a signal can be produced that is useful in control circuitry to prevent saturation. Two specific examples of this technique will now be briefly described. Other examples, or applications of the technique, will readily occur to those skilled in the art.

In summary, this new active method of detecting the impending saturation of power transformers is available for use by designers of switched-mode power converters. This technique, shown here for the first time, offers a simple and straightforward solution to the problems of degraded performance and catastrophic failures which can result from saturation of the power transformer. The method exploits a first-order nonlinear effect, in which two perpendicular magnetic fields interact in the transformer's core to produce a voltage signal which is related to the total flux. This signal can be used directly by the converter's control circuitry to prevent excessive flux excursions, and thereby protect the converter from the effects of saturation of the transformer. An especially attractive feature of this flux-sensing technique is that it can be implemented directly on many standard off-the-shelf ferrite cores without any mechanical modifications. In other configurations, only a small modification is required which does not affect the length of the magnetic path.

One of the two perpendicular fields in the core is produced by the conventional primary and secondary windings. The other field is introduced by an additional winding, transverse to both primary and secondary, which carries a few milliamps of dc current. The voltage which appears across the transverse winding outlines the nonlinearity of the B-H characteristic of the material and, as such, gives a direct indication of impending saturation.

Owing to the close relationship between the transverse voltage and the nonlinearity of the material, the voltage signal is a function of several extrinsic and intrinsic parameters: temperature, maximum flux excursion, frequency, and chemical composition are a few. The relationship of the signal to these and other parameters has been studied, and the information has been presented as an aid to design.

What is claimed is:

1. A method of detecting an impending saturation in nonlinear magnetic material for particular operating conditions in response to a varying magnetic field in a principal direction induced by a drive current through a coil around said material, said coil having its axis aligned in said principal direction, comprising the step of monitoring the rate of change of flux density of a magnetic field orthogonal to said varying magnetic field to produce a voltage proportional thereto, and the step of comparing said voltage with a predetermined threshold voltage characteristic of impending saturation of said material in said operating conditions.

2. A method as defined in claim 1 including the step of controlling said drive current to prevent saturation in response to the result of comparing said voltage with a predetermined threshold voltage characteristic.

3. A method as defined in claim 2 practiced for prevention of saturation of a power transformer in a switched-mode converter wherein the step of controlling said drive current is comprised of switching said drive current off when said voltage reaches said predetermined threshold.

4. Apparatus for detecting an impending saturation in nonlinear magnetic material for particular operating conditions in response to a varying magnetic field in a principal direction induced by a drive current through a coil around said material, said coil having its axis aligned in said principal direction comprising
    means for monitoring the rate of change of flux density of a transverse magnetic field to produce a voltage proportional thereto, and
    means for comparing said voltage with a predetermined threshold voltage characteristic of impending saturation of said material in said operating conditions.

5. Apparatus as defined in claim 4 further comprising means for controlling said drive current to prevent saturation in response to the result of comparing said voltage with a predetermined threshold voltage characteristic.

6. Apparatus as defined in claim 5 wherein said magnetic material is the core of a power transformer in a switched-mode converter, and wherein said means for controlling said drive current is comprised of means for switching said drive current off in response to said comparing means when said voltage reaches said predetermined threshold.

* * * * *